United States Patent [19]

Niblett

[11] Patent Number: 4,476,839

[45] Date of Patent: Oct. 16, 1984

[54] FUEL PRE-HEATER

[76] Inventor: Norman C. Niblett, 1203 Lockwood Cir., Salisbury, Md. 21801

[21] Appl. No.: 347,348

[22] Filed: Feb. 9, 1982

Related U.S. Application Data

[63] Continuation of Ser. No. 196,921, Oct. 14, 1980, abandoned.

[51] Int. Cl.³ ............................................. F02M 31/00
[52] U.S. Cl. ........................................ 123/557; 165/51
[58] Field of Search ..................... 123/557; 165/51, 52

[56] References Cited

U.S. PATENT DOCUMENTS

| | | | |
|---|---|---|---|
| 1,168,111 | 1/1916 | Pope | 123/557 |
| 1,361,503 | 12/1970 | Smith | 123/557 |
| 1,442,258 | 1/1923 | Dorris | 123/557 |
| 3,253,647 | 5/1966 | Deshaies | 123/557 |
| 4,015,567 | 4/1977 | Zabenskie | 123/557 |

FOREIGN PATENT DOCUMENTS

| | | | |
|---|---|---|---|
| 960534 | 1/1975 | Canada | 123/557 |
| 736439 | 11/1932 | France | 123/557 |
| 1025689 | 10/1950 | France | 123/557 |
| 53629 | 12/1942 | Netherlands | 123/557 |

*Primary Examiner*—Ronald H. Lazarus

[57] ABSTRACT

A fuel pre-heater for an internal combustion engine consisting of a coil in the fuel line in advance of the engine carburetor with a series of coil convolutions in heat transfer contact with the engine coolant conduit intermediate the radiator and the engine block with at least one section of said fuel line passing through said coolant conduit.

2 Claims, 3 Drawing Figures

U.S. Patent	Oct. 16, 1984	4,476,839
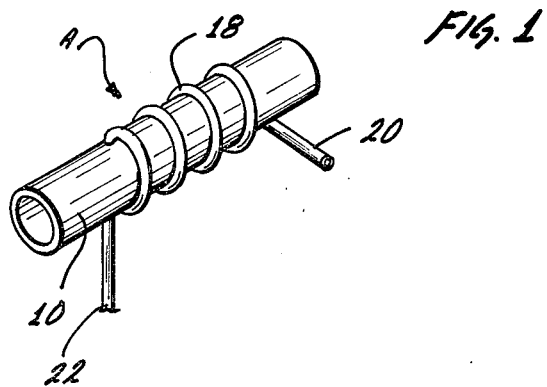
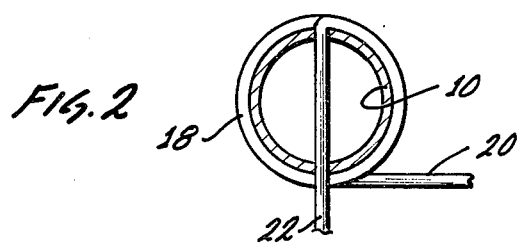
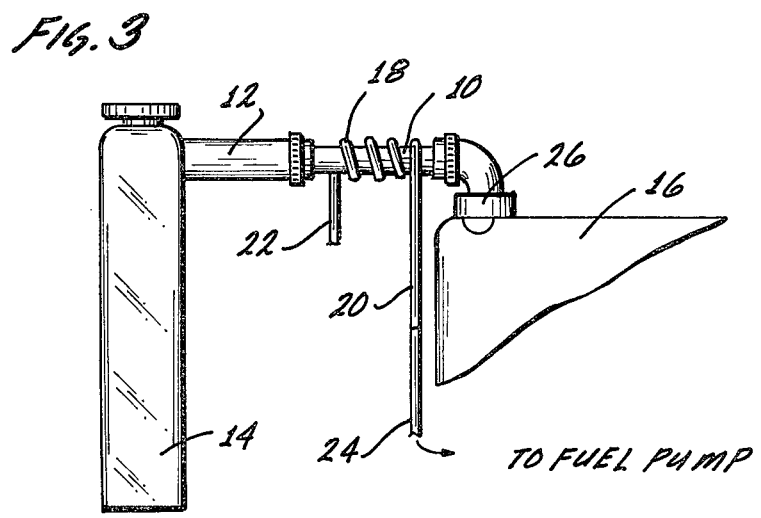

FUEL PRE-HEATER

This application is a continuation of application Ser. No. 196,921 filed Oct. 14, 1980, now abandoned.

The present invention relates to fuel pre-heater for internal combustion engines, and more particularly and specifically to a heater for fuel entering the carburetor of a typical internal combustion automobile engine.

It is the principal object of the present invention to provide a heater for increasing the temperature of fuel entering the carburetor of an automobile engine to obtain a resultant increase in engine efficiency.

Another object of the present invention resides in the provision of a fuel pre-heater for an automobile engine which has no working parts, and which can be quickly and easily assembled with usual components of such an engine.

Still another object of this invention rests in the provision of a fuel pre-heater which is assembled as an integral component of the cooling system of the typical automobile power plant, and which derives controlled heat from the system.

Yet another object and advantage of the present invention is the provision of an effective and efficient fuel pre-heater for an automobile engine which is very simple and inexpensive in design and manufacture, and a pre-heater which may be quickly, easily and inexpensively installed in automobiles now in operation.

Still other objects and advantages of the present invention will become readily apparent to those skilled in the art when the following description is read in the light of the accompanying drawings in which like numerals designate similar parts throughout the several views.

Referring now to the accompanying drawings:

FIG. 1 is a pictorial view of the pre-heater constituting the present invention.

FIG. 2 is a vertical cross-section through the pre-heater taken on line 2—2, FIG. 1.

FIG. 3 is a side elevation of the pre-heater constituting the present inventive concept assembled in the cooling and fuel systems of a conventional automobile engine.

With specific reference to the accompanying drawings in which there is illustrated a preferred embodiment of the present invention the letter A generally designates the pre-heater concept which consists of a short length of metallic, usually copper tubing 10 of an internal diameter corresponding to internal diameter of upper conduit or hose 12 connecting the radiator 14 and engine block 16 of the automobile with which the pre-heater is to be assembled. Associated with the tubing section 10 is a coil of metallic fuel line 18, usually copper, wound about and in surface to surface contact with the tubing 10, beginning externally and tangentially of said tube adjacent one end thereof, as at 20, with the second end of the coil penetrating or bisecting the tubing 10 adjacent the second end of the tubing in sealed joints, as at 22.

As is illustrated in the accompanying drawings the tangentially extending end of the coil, 20, is connected to the fuel line section 24 extending to and in communication with the fuel pump (not shown) of the automobile power plant, while the second end, 22, of the coil penetrating the tubing 10 is connected to that section of the fuel line extending to and communicating with the carburetor (not shown).

It is also important to recognize that the pre-heater A is assembled in the cooling system of an engine in advance of the usual thermostat 26 in such systems.

In operation, after installation of the pre-heater made in general conformity with the invention concepts fuel passing from the fuel pump to the carburetor will be heated in the coil 18 to a temperature of 180° F. to 190° F. under the operating control of the thermostat 26 which is set to maintain the engine coolant within this temperature as the result of which the fuel entering the carburetor has been increased to a range of optimum vaporization and ignition resulting in a reduced fuel consumption.

Having thus described and explained a preferred embodiment of my invention without intention to limit the concept thereon beyond the limitations of the appended claims, what I desire to claim is:

1. In a liquid-cooled engine having a radiator and an engine block connected thereto by a coolant conduit forming a coolant path, and having a fuel line for conveying fuel from a fuel pump to said engine for combustion, the improvement comprising:
    (a) metallic tube means inserted in said coolant path between said radiator and said engine block so as to cause coolant to flow through said tube; and
    (b) metallic fuel conduit means insert in said fuel line between said fuel pump and said engine, said fuel conduit means having a first end to which the fuel is fed from said fuel pump and a second end from which the fuel flows to the Engine;
    (c) said fuel conduit means including multiple convolutions shaped in a generally helical manner disposed around the outside of said tube means and in direct contact therewith; and
    (d) the last convolution of said helical fuel tube said second end extending through said coolant tube so as to be in direct contact with the coolant in said tube.

2. The improvement of claim 1, in which said last convolution extends diametrically through the center of said tube means.

* * * * *